United States Patent
Järvisalo et al.

(10) Patent No.: US 7,194,282 B2
(45) Date of Patent: Mar. 20, 2007

(54) METHOD FOR CONTROLLING TRANSMITTING POWER IN A WIRELESS COMMUNICATION DEVICE

(75) Inventors: Jari Järvisalo, Tampere (FI); Riku Rimpelä, Tampere (FI); Jarkko Oksala, Ylöjärvi (FI); Janne U. Aaltonen, Tampere (FI)

(73) Assignee: Nokia Corporation, Espoo (FI)

( * ) Notice: Subject to any disclaimer, the term of this patent is extended or adjusted under 35 U.S.C. 154(b) by 329 days.

(21) Appl. No.: 10/327,699

(22) Filed: Dec. 19, 2002

(65) Prior Publication Data

US 2003/0157955 A1    Aug. 21, 2003

(30) Foreign Application Priority Data

Dec. 20, 2001   (FI) ................................. 20012537

(51) Int. Cl.
  *H04Q 7/20*     (2006.01)
  *H04Q 17/04*    (2006.01)
  *H04B 7/00*     (2006.01)
(52) U.S. Cl. .................. 455/522; 455/69; 455/127.1
(58) Field of Classification Search ............... 455/522, 455/69, 127.1, 226.1, 67.11; 370/310, 343
   See application file for complete search history.

(56) References Cited

U.S. PATENT DOCUMENTS

| | | | | |
|---|---|---|---|---|
| 4,870,698 A | * | 9/1989 | Katsuyama et al. | 455/522 |
| 5,524,275 A | * | 6/1996 | Lindell | 455/117 |
| 5,528,593 A | * | 6/1996 | English et al. | 370/391 |
| 5,590,409 A | * | 12/1996 | Sawahashi et al. | 455/69 |
| 5,594,946 A | * | 1/1997 | Menich et al. | 455/522 |
| 6,359,934 B1 | * | 3/2002 | Yoshida | 375/262 |
| 6,421,327 B1 | * | 7/2002 | Lundby et al. | 370/310 |
| 6,529,494 B1 | * | 3/2003 | Ostman et al. | 370/337 |
| 6,775,531 B1 | * | 8/2004 | Kaewell et al. | 455/343.1 |

FOREIGN PATENT DOCUMENTS

| | | |
|---|---|---|
| EP | 0989689 | 3/2000 |
| FI | 106665 | 3/2001 |
| WO | 9503549 | 2/1995 |
| WO | 9633555 | 10/1996 |
| WO | 0001094 | 1/2000 |
| WO | 0031990 | 6/2000 |

OTHER PUBLICATIONS

3GPP TS 05.02 V8.9.0 (Apr. 2001) 3rd Generation Partnership Project; Technical Specification Group GSM/EDGE Radio Access Network; Digital cellular telecommunications system (Phase 2+) ; Multiplexing and multiple access on the radio path (Release 1999) ; pp. 1-77.

* cited by examiner

*Primary Examiner*—Tilahun Gesesse

(57) ABSTRACT

A method for power control of a wireless communication device (2) comprises the steps of defining the transmission power of at least one transmitter (12) of the wireless communication device (2), defining a power index ($POW_t$) on the basis of the transmission power of the transmitter (12), and selecting at least one limit value. The power index ($POW_t$) is compared with the limit value and, on the basis of the comparison, it is deduced whether there is a need to adjust the transmission power of the wireless communication device (2). The transmission power may then be adjusted accordingly. A related wireless communication device and a system shown.

14 Claims, 7 Drawing Sheets

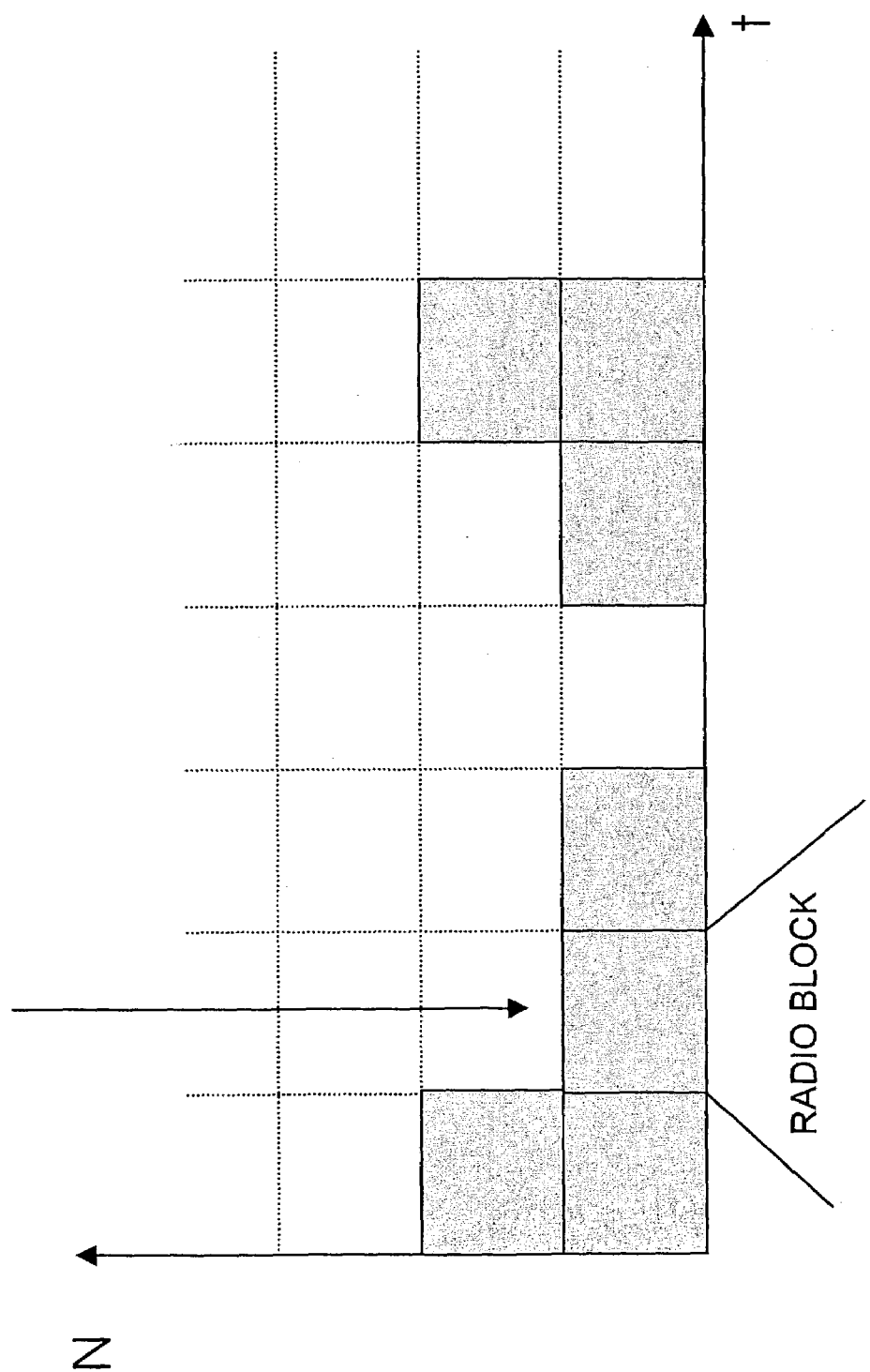

METHOD FOR CONTROLLING TRANSMITTING POWER IN A WIRELESS COMMUNICATION DEVICE

FIELD OF THE INVENTION

The present invention relates to a method for power control of a wireless communication device, in which method the power level of at least one transmitter of the wireless communication device is determined. The invention relates also to a wireless communication device comprising means for power control of the wireless communication device, and means for determining the transmission power of at least one transmitter of the communication device. Moreover, the invention relates to a system that comprises means for power control of the wireless communication device, and means for determining the transmission power of at least one transmitter of the communication device.

BACKGROUND OF THE INVENTION

Increasing demands will be placed on wireless communication speed e.g. due to the fact that wireless communication devices are used for other purposes than for transmitting mere speech. Wireless communication devices will be used e.g. for file transfer, browsing of www pages with a www browser, browsing of WAP pages with a WAP browser, transmission of real time video signal, etc. In such applications, relatively high speed communication is required to avoid unreasonable waiting times.

In a prior art second generation GSM system, data is transmitted in compliance with the TDMA principle (time division multiple access), where eight timeslots of one TDMA frame are allocated for different wireless communication devices. A maximum of one reception and one transmission timeslot is allocated for one wireless communication device. Consequently, the communication rate of the wireless connection is limited to approximately 14.4 kbit/s, at most. To increase the communication speed, a high speed circuit switched data connection has been designed, which allows, if necessary, more than one TDMA timeslot to be allocated for a single wireless communication device for reception and/or transmission (multi slot). Additionally, the general packet radio service GPRS, designed for the GSM system, uses multiple timeslots and enables higher communication speeds compared to second generation GSM systems. Such mobile communication systems are also being developed where a wireless communication device can simultaneously communicate using both a circuit switched connection and a packet switched connection. Hence, some of the transmission timeslots allocated for the wireless communication device are used in the transmission of the circuit switched connection, and some of the transmission timeslots are used in the transmission of the packet switched connection.

In the GSM system, bursts are used in the transmission of information in a manner that during one timeslot, one burst is transmitted. Such a burst contains, in addition to the information to be transmitted, e.g. acquisition bits (training sequence) and tail bits. Speech and data is transmitted in these bursts as follows. The information to be transmitted is converted, if necessary, to binary form and divided into data frames, each having a certain amount of bits. These data frames are also called radio blocks. These data frame bits are typically placed in more than one burst. The division into bursts is carried out e.g in a manner that the data frame bits are divided into eight parts and two parts are transmitted in one burst. To this end, four bursts are needed for transmitting the whole data frame, which means that the transmission of one data frame lasts approximately 20 ms. On the other hand, each part can be transmitted in a burst of its own, wherein bits of two different data frames can be transmitted in one burst. FIG. 1a shows a fifty-two multiframe which is used for transmitting data packets and is thus composed of fifty-two TDMA frames. Twelve data frames can be transmitted in such a fifty-two multiframe (B0 to B11). In turn, FIG. 1b shows a twenty-six multiframe which is used for transmitting speech and is thus composed of twenty-six TDMA frames.

In the exemplified GSM system, the length of one timeslot is approximately 577 μs and the length of the TDMA frame (8 timeslots) is thus approximately 4.615 ms. Interlocking data frames e.g. into four TDMA frames involves that the transmission interval is approximately 20 ms.

Among other things, one problem present in such faster connections is, that the power consumption of a wireless communication device increases the more often the wireless communication device is transmitting. Therefore, an increase in the number of transmission timeslots allocated for the wireless communication device will increase the power consumption of the wireless communication device. This increased power consumption shortens the operation time of the battery, wherein the battery has to be charged more often. Additionally, the power will partially turn into heat in the wireless communication device, wherein more attention is to be directed to cooling, among other things, for the reason that an increase in the operation temperature will increase the probability of damaging the components of the wireless communication device and shortening the life of the wireless communication device.

One solution to the previously described problem would be to reduce the transmission power (power grade) of the wireless communication device, e.g. from 2 W to 0.8 W. However, in practice this would involve that the strength of the signal transmitted by the wireless communication device decreases, which can limit the distance between the wireless communication device and the base station. Thus, the connection can be even disconnected, particularly at border areas of a cell.

Another solution would be to reduce the number of transmission timeslots e.g. to one timeslot per frame. At the same time, this involves that the communication speed from the wireless communication device to the base station (uplink) is decreased, which is not always advisable. On the other hand, reducing the number of transmission timeslots enables using higher transmission power for one timeslot. This will involve that the data transmitted from the wireless communication device to the base station is more likely to be duly received and there will be less need for re-transmissions, wherein the transmission speed can even be improved.

International patent application WO 00/31990 introduces a power saving system in which the temperature of the wireless communication device is monitored by using a temperature sensor. The temperature shown by the temperature sensor is compared to a threshold value, and if the temperature exceeds this threshold value, the transmission power or the transmission speed (the number of transmission timeslots per time unit) is reduced. In some situations it may even be necessary to cut off the connection, if the reduced transmission speed is insufficient for the application transmitting information from the wireless communication device. This kind of arrangement requires also that the temperature sensor is located in a suitable place in the wireless communication device, as well as means for processing the data provided by said temperature sensor. However, the temperature may in some other location exceed the temperature shown by the temperature sensor, wherein the measuring result is not necessarily reliable.

Increasing power consumption can also be problematic because wireless communication devices may comprise other transmitters than the one used for communication with a mobile communication network. The wireless communication device can e.g. have short range communication means, such as a Bluetooth™ radio transceiver. These communication means can operate simultaneously with the transmitter transmitting to the mobile communication network, which can also increase the power consumption of the wireless communication device.

SUMMARY OF THE INVENTION

A purpose of the present invention is to bring about a method for controlling the power consumption of a wireless communication device, and a wireless communication with a controllable power consumption. The invention is based on the idea that a so-called power index is defined and, on the basis of the value of this power index, the transmission settings of the wireless communication device are adjusted, if necessary. This power index indicates the power consumed by the transmitter of the wireless communication device in a certain time, i.e., the average power consumption during a measurement phase. If the power index exceeds a determined limit value, the power consumption is reduced preferably by lowering the transmission power and/or lowering the number of transmission timeslots of the wireless communication device. To be more exact, the method according to the present invention is mainly characterized in that a power index is determined on the basis of the transmission power of the transmitter, at least one limit value is selected, said power index is compared with said limit value, and in accordance with the comparison it is determined whether there is a need to adjust the transmission power of the wireless communication device. The wireless communication device in accordance with the present invention is mainly characterized in that the wireless communication device further comprises means for defining the power index on the basis of the transmission power of the transmitter, means for selecting at least one limit value, means for comparing said power index with said limit value, and means for deducing, in accordance with the comparison, whether there is a need to adjust the transmission power of the wireless communication device. The system in accordance with the present invention is mainly characterized in that the system further comprises means for index definition in order to determine the power index in accordance with the transmission power of the transmitter, means for selecting at least one reference value, comparison means for comparing said power index to said reference value, and deducing means for deducing, on the basis of the comparison, whether there is a need to adjust the transmission power of the wireless communication power.

The present invention shows remarkable advantages over solutions of prior art. No temperature sensor, nor means for processing the measurement result obtained by the temperature sensor are necessary in the wireless communication device of the invention. Power control can be carried out at sufficient accuracy using the method according to the invention, since the definition of the power consumed by the wireless communication device is based on real transmission power and not on power estimated indirectly on the basis of a temperature change. Hence, more reliable power control can be achieved and unnecessary decreases in the power level or reductions in transmission speed can be avoided.

DESCRIPTION OF THE DRAWINGS

In the following, the present invention will be described with reference to the appended drawings, in which FIG. 5 shows, in a principle view, an example where the wireless communication device uses transmission timeslots for transmitting data frames.

DETAILED DESCRIPTION OF THE INVENTION

Figure 1A:
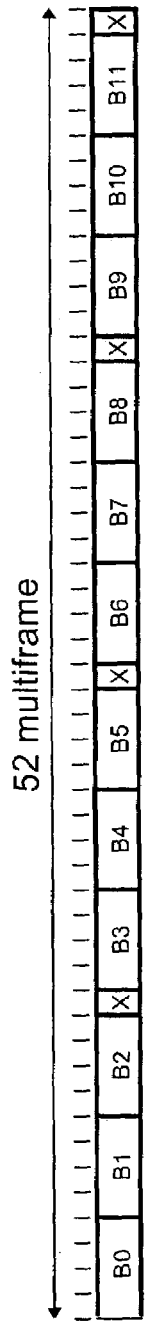
FIGS. 1a and 1b show frame structures used in the GSM mobile communication system.
Figure 1B:
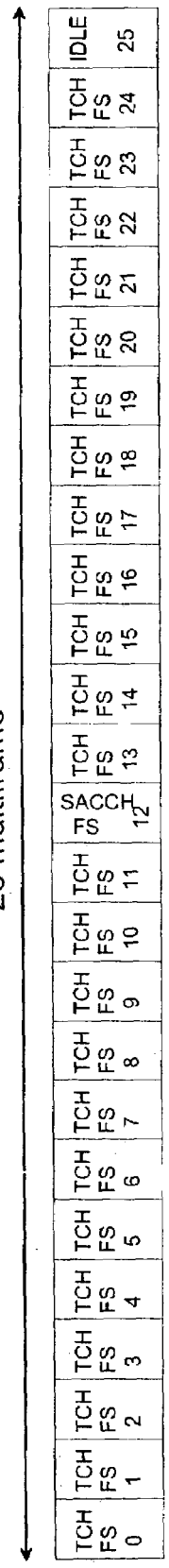
Figure 2:
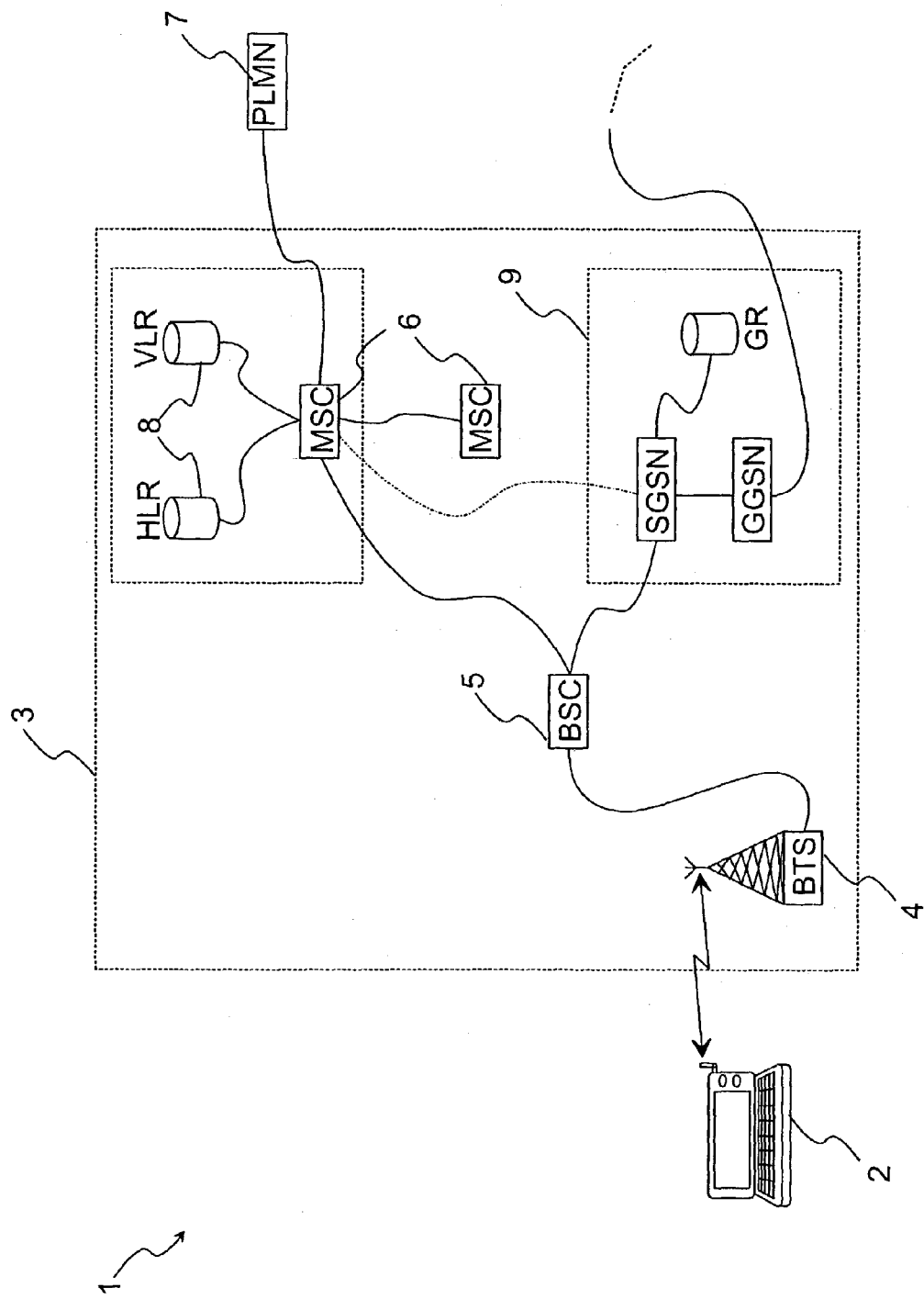
FIG. 2 shows a mobile communication system, where the invention can be applied.

In the mobile communication system 1 of FIG. 2, the wireless communication device 2 can communicate with the mobile communication network 3 via a base station 4. The base station 4 is controlled by a base station controller 5. In a circuit switched connection, a call can be directed from the base station 4 to a mobile switching centre 6. A circuit switched connection can be further coupled to another wireless communication device or e.g. to a telecommunication terminal (not shown) connected to a public switched telephone network 7. The mobile switching centre 6 is provided with registers 8 of the mobile communication network, such as the home location register HLR and the visitor location register VLR. These registers are used for example for defining and checking the authorizations of mobile device subscribers and for storing the data of wireless communication devices 2 that are logged into the mobile communication network. The mobile communication system 1 of FIG. 2 also comprises a packet-switched network 9, e.g. a GPRS (General Packet Radio Service) packet switched network. Via this packet-switched network 9, the communication of the packet-switched connection is carried out between the wireless communication device 2 and some other terminal device. The packet-switched network 9 can use registers 8 of the mobile communication network 3, wherein separate registers are not necessarily needed in the packet switched network e.g. for storing the subscriber data.

In the mobile subscriber data, the mobile communication network operator can arrange certain authorization for a mobile subscriber to use the wireless communication device. This data defines e.g. the multi slot class or classes that are supported by the wireless communication device. For example, the GSM mobile communication system standard 3GPP TS 05.02 V8.9.0 (2001–04), Appendix B (pp. 62 to 66) defines 29 different timeslot classes and, for each timeslot, the maximum number of reception timeslots (Rx timeslot) and transmission timeslots (Tx timeslot) that can be allocated for a wireless communication device operated in each class. In addition, the maximum number of timeslots per one TDMA frame can be defined for a timeslot class. For example for a wireless communication device in the timeslot class 6, a maximum of three reception timeslots and two transmission timeslots can be allocated, however in a manner that the combined number of reception and transmission timeslots per one TDMA frame is four.

Figure 3:
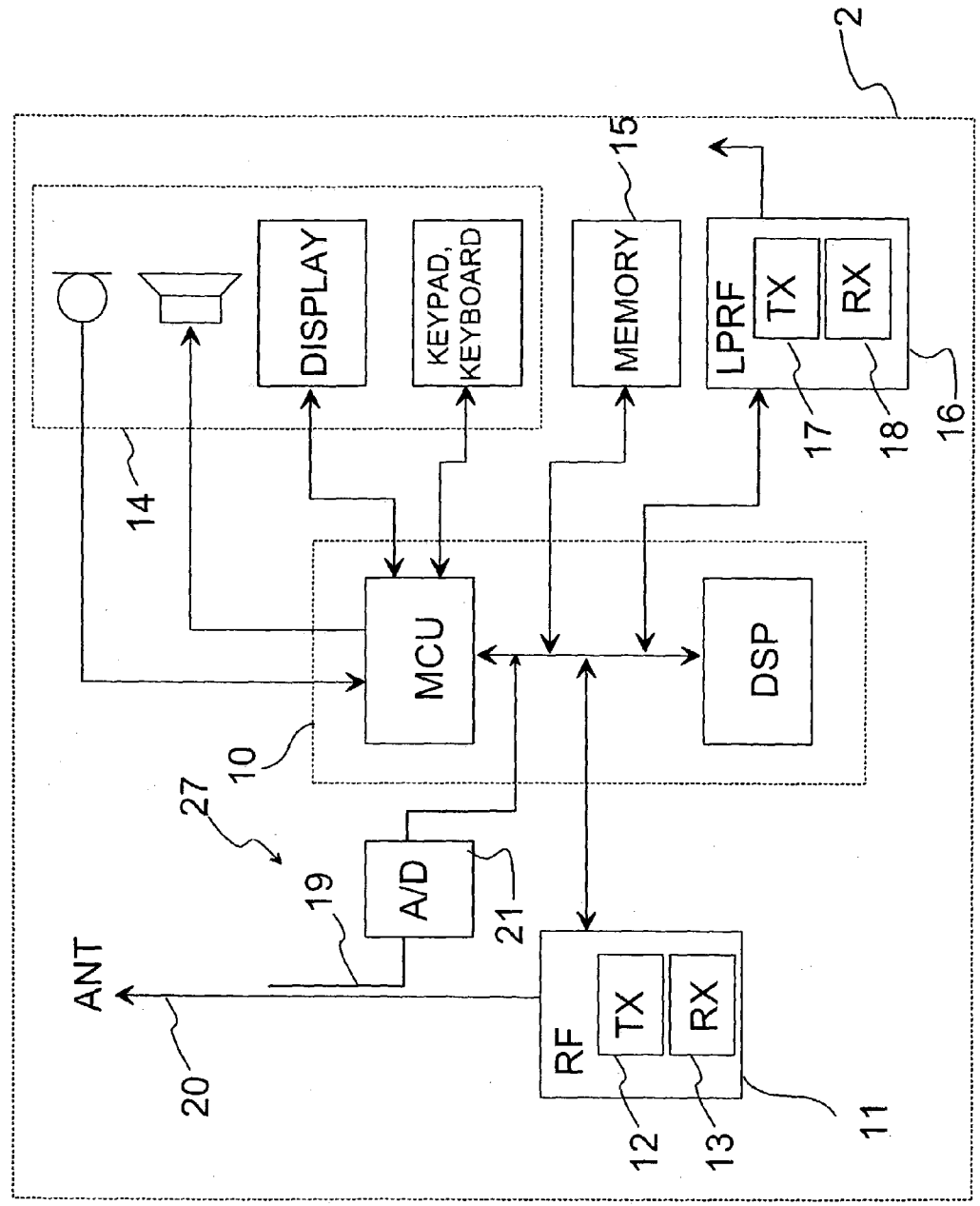
FIG. 3 shows, in a simplified block diagram, a wireless communication device according to a preferred embodiment of the invention.

FIG. 3 shows, in a simplified block diagram, a wireless communication device 2 complying with a preferred embodiment of the invention. It comprises a control block 10 with one or a plurality of processors, such as a micro controller unit (MCU) and/or a digital signal processing unit (DSP). The purpose of the control block is to control the functions of the wireless communication device 2. The wireless communication device 2 further comprises mobile communication means 11, comprising e.g. a transmitter 12 and a receiver 13. A user interface 14 is used for presenting information to a user and for entering commands and data processed by the user to the wireless communication device 2. Memory means 15 of the wireless communication device are used e.g. for storing data needed while using the wireless communication device 2 and for storing application programs. The memory means 15 are preferably provided with one or multiple transmission buffers and reception buffers for temporary data storage. The wireless communication device 2 according to FIG. 3 comprises also local communication means 16, such as a short range radio transmitter 17 and receiver 18. Utilizing the local communication means 16, the wireless communication device 2 can communicate with other such devices in the vicinity that comprise corresponding local communication means. Preferably, the wireless communication device 2 is also provided with means 27 for measuring transmission power, these means being able to measure at least the transmission power of the transmitters 12 of the mobile communication devices. These means 27 for measuring transmission power preferably comprise a directional coupler 19, or the like, which can be used for generating an analogue signal that is relative to the power directed to an antenna 20 of the mobile communication means, the signal being preferably converted into digital in an analogue/digital converter 21.

It is evident that said means for measuring transmission power 27 are not necessarily required if the transmission power can be determined using some other means or methodology in the wireless communication device 2. For example, the GSM system uses different power class definitions for the wireless communication device and a maximum transmission power is determined for each power class. Hence, if the power class used in the transmission is known, it is possible to deduce the maximum power of the transmitter 12 and no separate measurement is necessary. For example, the control block 10 can, using predefined parameters, set the transmission power of the transmitter 12 to correspond to the maximum power of the selected power class. However, in practice the transmission power does not fully correspond to this maximum power and the transmission power can even vary slightly, e.g. due to objects in the vicinity of the antenna. Nevertheless, this inaccuracy is of little significance in view of the present invention.

In the following, the operation of the method according to an advantageous embodiment of the invention is described in the system of FIG. 2 and the wireless communication device 2 of FIG. 3, in which device the transmission power is determined by measuring. It is assumed that the wireless communication device 2 is a wireless communication device complying with the timeslot class 6. For example, in the wireless communication device 2, an application is processed, and during this processing, communication is necessary between the wireless communication device 2 and the mobile communication network 3. This can be carried out advantageously via a packet switched connection. When establishing a packet switched connection, a request for setting up the packet switched connection is transmitted from the wireless communication device to the mobile communication network 3. Next, the mobile communication network 3 starts the set-up procedures for the packet switched connection and allocates certain transmission and reception timeslots for the connection. Information on these timeslots is transmitted to the wireless communication device 2, which can thus set the receiver 13 of the mobile communication means 11 to receive during the correct TDMA timeslots. In a corresponding manner, the wireless communication device 2 can set the transmitter 12 of the mobile communication means 11 to transmit during the correct transmission timeslots.

In the packet switched connection the wireless communication device 2 cannot necessarily transmit during every transmission timeslot, wherein the cumulative transmission power does not necessarily grow at a regular rate. Hence, in the method of the invention at least the transmission power generated in the transmitter 12 of the mobile communication means 11 is defined during a determined time, i.e. a so-called power index $POW_t$. This power index $POW_t$ indicates an average transmission power at a certain time.

When the transmission timeslot is initiated, the measurement of the transmission power generated in the transmitter 12 is started using means for measuring the transmission power 27. Since the length of the transmission timeslot and the number of transmission timeslots used in transmission of one dataframe are known, it is possible to determine on the basis of this information the average transmission power generated during the transmission of one dataframe. The power information determined for different dataframes can be cumulatively combined e.g. by integration in order to calculate the power index. However, this requires a large memory capacity, which is not necessarily possible or rational to arrange in practical wireless communication devices. One TDMA frame contains eight timeslots, wherein eight measurement values per each such period of 20 ms should be stored. If the measurement period (expressed as the length of the calculation window) used is e.g. six minutes, storage capacity is needed for 144 000 samples (=8*360 s/0.002 s), as well as calculation capacity for carrying out the integration of the transmission power values of each dataframe.

For reducing the memory and calculation needs, the following steps are taken in an advantageous method of the invention. The power index $POW_t$ is defined as the running mean value of the dataframe.

$$POW_t = POW_{t-1} * \frac{m-1}{m} + POW_{inc} * \frac{1}{m}, \qquad (1)$$

in which t indicates the dataframe in progress (moment of time), m is the size of the mean value window, and $POW_{inc}$ is an increase in the power index.

In this advantageous embodiment, the increase of the power index is calculated for each dataframe as follows.

$$POW_{inc} = \alpha * \sum_{n=0}^{N} P_L(n) \quad (2)$$

in which

α is a scale factor (=1),

N is the number of active timeslots during transmission of the dataframe, and $P_{L(n)}$ is the relative power level used in each transmission timeslot.

Other possible simultaneously active transmitters of the wireless communication device 2 have an effect on the scale factor α, these transmitters including e.g. a transmitter 17 of the local communication means 16. It is advantageous to define the value of this scale factor by tests carried out to different combinations and to store the different values of the scale factor into the memory means 15. Hence, when calculating the increase in the power index, it is examined which other transmitters are possibly operative, and among the scale factor values stored in the memory means 15 the one is selected that corresponds to the present situation. In case it is not possible to measure the power generated by the transmitter 12 of the mobile communication means 11, the power can be determined by means of the power class used. Table 1 shows a few exemplary values of such power classes and the corresponding power values. This table, to the degree that different power levels are available in the wireless communication device 2, is advantageously stored in the memory means 15. The wireless communication device 2 contains information about the power level used by the transmitter in each timeslot, wherein this information can be used to obtain the corresponding relative power level from the Table 1.

TABLE 1

| Power level | Nominal power (dBm) | Relative power level ($P_{L(n)}$) |
|---|---|---|
| 5 | 33 | 1 |
| 6 | 31 | 31/33 (≈0.94) |
| 7 | 29 | 29/33 (≈0.88) |
| 8 | 27 | 27/33 (≈0.82) |
| 9 | 25 | 25/33 (≈0.76) |
| ... | ... | ... |

On the basis of the table it is possible to deduce that e.g. transmitting four dataframes on a power level 9 corresponds to an increase in the power index that is of the same order of magnitude as sending three dataframes on a power level 5.

To this end, the above embodiment requires the information about the power class used in each timeslot, the number of active timeslots during dataframe transmission, and other simultaneously transmitting transmitters of the wireless communication device. Thus, one calculation is carried out per dataframe, in which calculation the increase in the power index is determined, and on the basis of this information the running mean value of the power index is calculated. The calculated running mean value is stored to be used in the next calculation. It is not necessary to store separate calculation results or power level values, wherein less memory capacity is needed compared to a situation where a large group of measurement values are stored. Nevertheless, it is obvious that the aforementioned calculation formulas are presented merely as an advantageous example, but also other calculation methods can be used for controlling the transmission of wireless communication device transmitters.

After calculating a new value for the power index, the calculated power index $POW_t$ is compared to one of the reference values. This reference value can be different in different wireless communication devices 2 and different criteria can be taken into account when selecting the reference value, for example the battery capacity, cooling properties etc. of the wireless communication device 2. Even the use position can be taken into account when defining the reference value, i.e. the reference value is not necessarily fixed, but can vary in different situations. For example the Nokia 9210 Communicator wireless communication device has at least two different operative positions: cover closed and cover open. Thus, conduction of power in these different operative positions can be different, which has an effect on the highest allowed power index value.

If comparison between the power index and the reference value indicates that there is no need to lower the power, the operation of the wireless communication device 2 can be continued without changing the transmission power and/or the timeslot class. Thus, the calculation of the power index can be continued according to the above-described formulas. Correspondingly, in a situation where the comparison indicates that the power has exceeded the limit defined by the reference value, the necessary steps are to be taken to limit the power. This can be carried out e.g. in a manner that transmission of dataframes of one or multiple applications is temporarily prevented, the transmission power is reduced and/or the number of transmission timeslots per one frame is reduced (the timeslot class is changed). In practice, an advantageous alternative is to temporarily prevent transmission of the dataframes of the application, e.g. in a manner that only a part of the timeslots allocated for the application are used, and the transmitter 12 of the mobile communication means is turned off during other timeslots allocated to the application. The present situation of the wireless communication device 2 can also be considered when limiting the power. The wireless communication device 2 can also be located by the edge of a cell, wherein the signal level received at the base station is normally lower than if the wireless communication were closer to the base station. Hence, lowering the transmission power is not necessarily reasonable, because it is possible that the base station can no longer receive the signal transmitted by the wireless communication device 2. Thus, the power can be restricted by decreasing the number of transmission timeslots. However, this will decrease the transmission speed, but this drawback is nevertheless probably less serious compared to the decrease in connection reliability caused by decrease in power. The user may detect no apparent change in the communication speed, even if the number of the timeslots used has been decreased. This is because fewer re-transmissions are probably required when a higher power level is used. Other measures for limiting the power can include abnormal cancellation of the packet switched connection towards the uplink (from the wireless communication device to the base station), dividing the transmission into phases (DTX discontinuous transmission), or disconnecting a call in the circuit switched connection. Obviously, also other measures for limiting the power can be used in connection with the present invention, such as flow control.

Restricting the power transmitted by the wireless communication device 2 is usually necessary only in situations, in which more than one timeslot per frame is used, and the transmission power is relatively high. In this case, it is possible to consider in the method the timeslot class and the transmission power and to calculate the power index e.g. only when using certain timeslot classes and/or power levels. Typically, higher power levels are used at the border areas of a cell and other such places where the radio signal attenuates considerably, e.g. due to highrise buildings, terrain conditions, or the like. Additionally, other factors can have an effect on the transmission power. For example, other radio transmitters in the vicinity, such as other wireless communication devices, can affect the audibility of the signal of the wireless communication device 2 at the base station. Moreover, the number of adjacent cells can be utilized as a criterion when selecting the transmission power.

In this context it should be mentioned that the method according to the invention can be applied also in other systems and using any number of timeslots, not only in the situations described above, where the largest possible number of transmission timeslots per frame is eight.

Moreover, power measurements are not limited merely to packet switched connection, but power measurements are carried out also for timeslot phases used in transmission of the circuit switched connection.

Figure 4A:
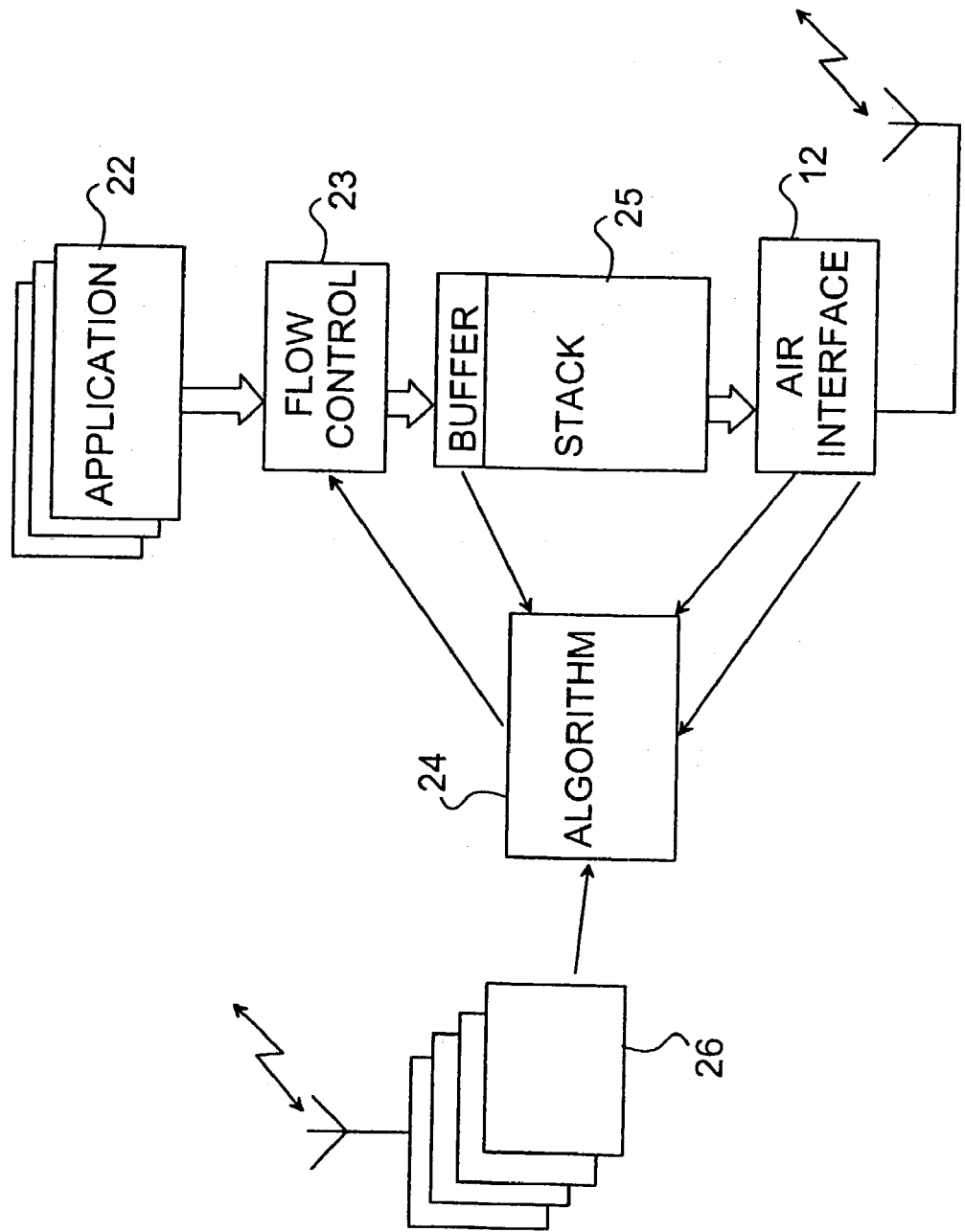
FIGS. 4a and 4b show, in a simplified form, transmission control applied in an advantageous embodiment of the invention.
Figure 4B:
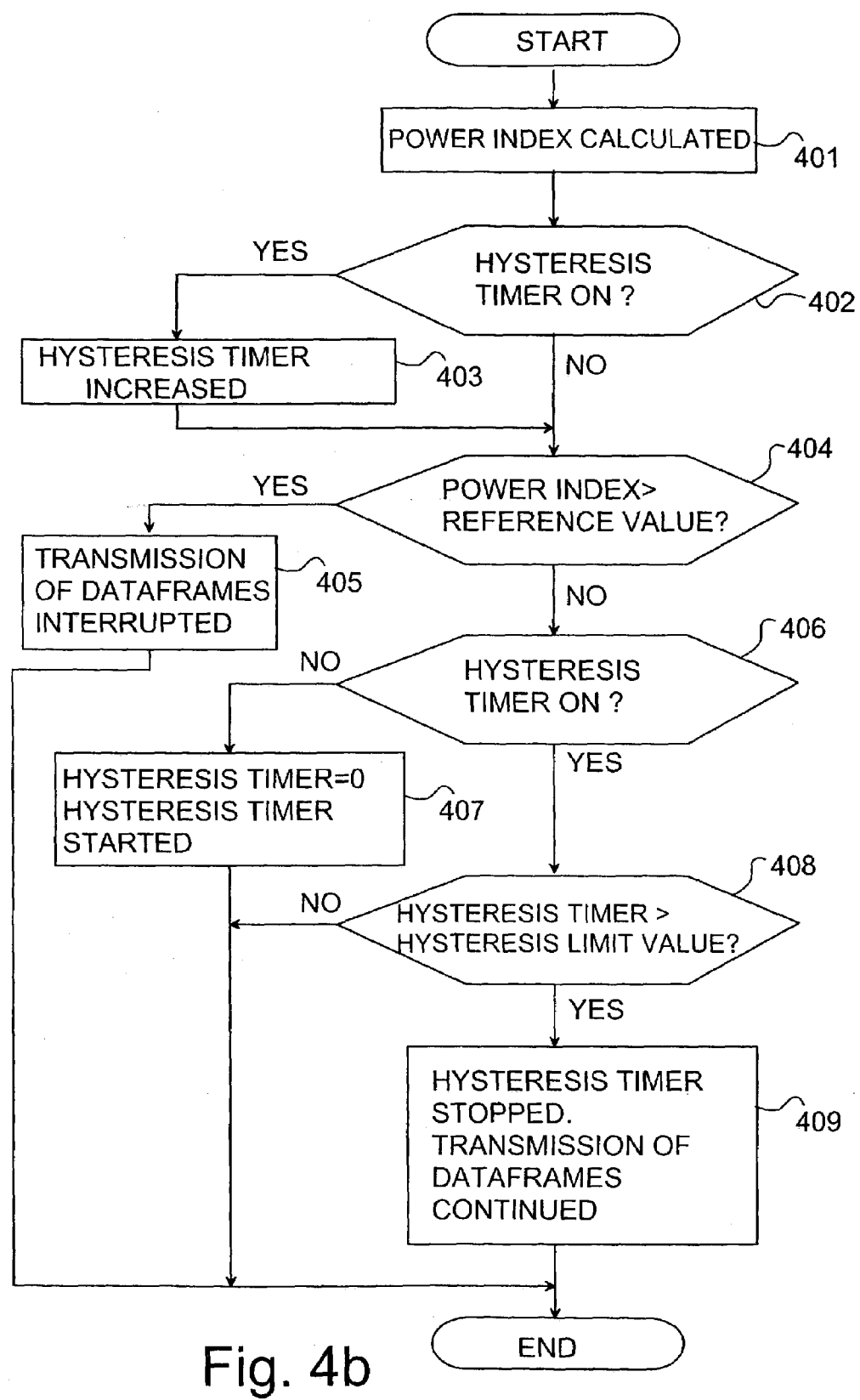

FIGS. 4a and 4b show, in a simplified form, transmission control adapted in a method according to a preferred embodiment of the invention. FIG. 4a shows applications 22 where data flows are generated to be transmitted to the mobile communication network 3. In the flow control block 23 the transmission of dataframes is restricted, if necessary, on the basis of information from the algorithm 24. The algorithm 24 is for example composed of the formulas (1) and (2) described earlier in this specification and of said comparison to the reference value. If the comparison carried out in the algorithm 24 does not require limitation of the transmission power, it is possible to transfer the dataframes of the application to a transmission buffer 25. From the transmission buffer 25, bursts are generated of the dataframe information and necessary channel codes are carried out in a manner known as such, whereafter transmission can be performed in the transmitter 12.

Operation of an algorithm 24 according to a preferred embodiment of the invention is shown in FIG. 4b. In the algorithm the input used is e.g. data on the number of timeslots in a frame (timeslot class), as well as information on the power level used in each transmission timeslot. Additionally, the activity of other devices of the wireless communication device 2 can be used as input (marked in FIG. 4a as reference 26; e.g. a transmitter of the short range communication means) and the amount of information queuing to be transmitted in the transmission buffer. In this algorithm, e.g. a hysteresis limiting value and a hysteresis timer are defined for preventing changes too quickly in situations where the transmission power is limited. The algorithm calculates a power index $POW_t$ value (block 401) and examines whether the hysteresis timer is running (block 402). If the hysteresis timer is running, its value is advantageously changed by adding one (block 403). The calculated power index value $POW_t$ is compared in block 404 with a reference value $P_{HIGH}$. If the comparison shows that the power must be limited (the value of the power index is larger than the reference value), the power is restricted by interrupting the transmission of the data frame of the application (block 405). Thereafter, the operation of the algorithm 24 is interrupted, and it is started again from block 401, when there is a need to calculate the value of the next power index $POW_t$.

In case the comparison of the power index $POW_t$ value and the reference value $P_{HIGH}$ in block 404 indicates no need to limit the power (the power index $POW_t$ value is smaller than the reference value $P_{HIGH}$), it is examined whether the hysteresis timer is running (block 406). If the hysteresis timer is not running, a move is made to the block 407, where the hysteresis timer is calibrated to its initial value (advantageously set to zero) and the calculation of the hysteresis timer is started, whereafter the operation of the algorithm 24 is stopped. If, instead, the hysteresis timer is running, it is examined whether the hysteresis timer has been running for the predefined period of time (block 408). This can be discovered e.g. by comparing the value of the hysteresis timer to the predetermined hysteresis limit value. If the hysteresis timer has been running at least for the predefined time, the hysteresis timer is stopped and the transmission of dataframes that was discontinued in block 405 is continued (block 409).

Algorithm 24 can also take into account status data of the transmission buffer 25, such as information about the data waiting to be transmitted. Thus, in a situation where information should be limited and there is, however, only very little data waiting to be transmitted, it is possible to continue the transmission without limiting the transmission power.

FIG. 5 shows, in a principle view, an example where the wireless communication device 2 uses transmission timeslots for transmitting data frames. The horizontal axis t shows the time and the vertical axis N shows the number of dataframes transmitted during the time when dataframes are transmitted (timeslots/frame). Dark blocks show transmission timeslots used by the wireless communication device 2.

When calculating the power index value, the following matters can also be considered. The calculated power index value is stored into the memory means in a manner that it is maintained there at least for a certain period of time, also when the wireless communication device 2 is switched off. The power index value is set to its initial value (set to zero), in case the transmitter 12 of the wireless communication device 2 has been switched off at least for a certain continuous period of time, advantageously for the time of said time window, which in an advantageous example is approximately six minutes. When calculating the power index value, all connections active in the wireless communication device 2 are considered. This condition is valid in the operation of the previously described algorithm 24.

Even if the invention has been described with the example of the GSM mobile communication system and timeslot transmission, it is obvious that the invention can be applied also in other systems where multiple access technique are applied, i.e. multiple wireless communication devices can transmit in the same channel, and where one wireless communication device can transmit dataframes of more than one data flow. The multiple access technique can be based on time division (TDMA), as described above, frequency division (FDMA), and/or code division (CDMA).

Complying with an advantageous embodiment of the present invention, the first and second reference values are determined. These first and second reference values are used for maintaining the power index within a desired value range. To this end, the value index is compared to said first and second reference value. If the power index is larger than said second reference value, the transmission power of the wireless communication device 2 is limited. In a corresponding manner, if the power index is lower than said first reference value, also in this case the transmission power of the wireless communication device 2 is adjusted, but in this situation the transmission power can be increased and/or the number of transmission timeslots can be increased.

Figure 6:
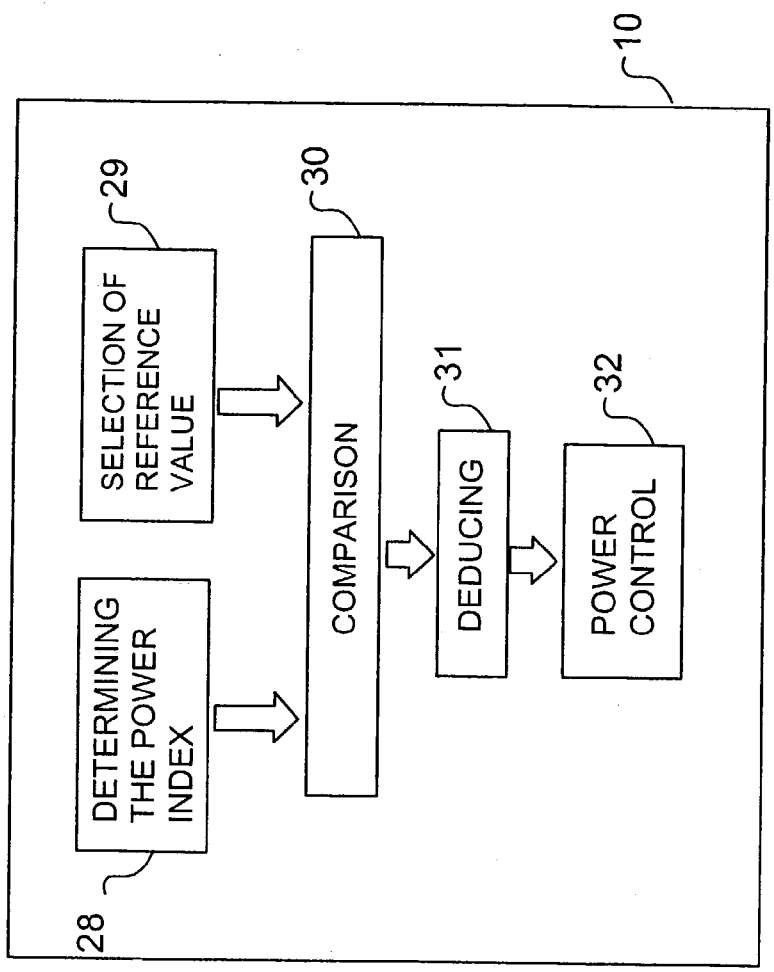
FIG. 6 shows, in a simplified form, how different functions implemented in accordance with an advantageous embodiment of the invention are divided in the control block.

Calculation and adjusting functions of the method according to the invention can to a great extent be implemented as functions of the control block 10, as in the application program of one or multiple processors. FIG. 6 shows, in a simplified view, division of different functions in this control block 10, such as defining 28 the power index, selecting 29 the reference value, comparing 30, deducing 31 the need for power control, and power control 32. Nevertheless, it is obvious that this division is intended only to exemplify the invention, not to restrict it. A part of the previously mentioned functions can in some application implementations be external to the control block, either partly or entirely. Further, it is obvious that also other functions, apart from those shown in FIG. 6, are determined in the control block.

Based on the foregoing teachings, it will be evident to those of skill in the art that the present invention is not limited solely to the above-presented embodiments, but it can be modified within the scope of the appended claims.

The invention claimed is:

1. A method for power control in a wireless communication device, in which method the transmission power of at least one transmitter of the wireless communication device is determined,
   wherein a power index is determined on the basis of the transmission power of the transmitter, at least one reference value is selected, said power index is compared with said reference value and, on the basis of the comparison, it is deduced whether there is a need to adjust the transmission power of the wireless communication device,
   wherein if the comparison shows that said power index is larger than said reference value, the transmission of the transmitter is interrupted,
   wherein said power index at different moments of time is defined by calculating the increase in the power index, and that at least a part of the calculated power index increase and at least a part of the power index increase defined during the previous moment of time are combined as the new power index, and
   wherein in said calculation of the power index a scaling factor, the number of active timeslots per time unit, and the relative power level used in each transmission timeslot, are used.

2. The method as set forth in claim 1, wherein a first and a second reference value are determined, and if the comparison indicates that said power index is smaller than said first reference value, the transmission is enabled, or if the comparison indicates that said power index is larger than said second reference value, the transmission is interrupted.

3. The method as set forth in claim 1, wherein the transmitter transmits information in timeslots, and that the transmission power of the wireless communication device is adjusted by changing the number of transmission timeslots per time unit.

4. The method as set forth in claim 1, wherein in the wireless communication device at least two transmitters are used, and that in the calculation of the power index all simultaneously used transmitters are considered.

5. An apparatus comprising:
   means for adjusting the power of a wireless communication device,
   means for determining the transmission power of at least one means for mobile communication of the wireless communication device,
   means for defining the power index on the basis of the transmission power of said at least one means for mobile communication,
   means for selecting at least one reference value,
   means for comparing said power index with said reference value, and
   means for deducing, on the basis of the comparison, whether there is a need to adjust the transmission power of the wireless communication device;
   wherein if the comparison shows that said power index is larger than said reference value, the means for deducing are for interrupting the transmission of said at least one means for mobile communication; and
   wherein in said defining of the power index a scaling factor, the number of active time slots per time unit, and the relative power level used in each transmission timeslot, are arranged to be used.

6. The apparatus as set forth in claim 5, wherein said means for adjusting the power of the wireless communication device comprise means for interrupting the transmission power of said means for mobile communication.

7. The apparatus as set forth in claim 6, comprising means for transmitting information in timeslots from said at least one means for mobile communication, and that said means for adjusting the power of the wireless communication device comprise means for changing the number of transmission timeslots per time unit.

8. A system, comprising:
   power control means for adjusting the power of a wireless communication device,
   power defining means for determining the transmission power of at least one transmitter of the wireless communication device,
   definition means for defining the power index on the basis of the transmitter's transmission power,
   selection means for selecting at least one reference value,
   reference means for comparing said power index to said reference value, and deducing
   means for deducing, on the basis of the comparison, whether there is a need to adjust the
   transmission power of the wireless communication device, wherein if the comparison shows that said power index is larger than said reference value, the deducing means are configured to interrupt the transmission of the transmitter, and wherein in said defining of the power index a scaling factor, the number of active time slots per time unit, and the relative power level used in each transmission timeslot, are arranged to be used.

9. An apparatus comprising:
   a transmitter;
   a power controller configured to adjust the power of a wireless communication device;
   a power definer configured to determine the transmission power of said transmitter;
   a power index defining element configured to define the power index on the basis of the transmission power of the transmitter;
   a selector configured to select at least one reference value;
   a comparator configured to compare said power index with said reference value; and
   a control element configured to interrupt the transmission of the transmitter if the comparison indicates that said power index is greater than said reference value;
   wherein in said defining of the power index a scaling factor, the number of active time slots per time unit, and the relative power level used in each transmission timeslot, are arranged to be used.

10. The apparatus as set forth in claim 9, further comprising another reference value; wherein said comparator is further configured to compare said power index with said another reference value; and the control element is further configured to enable the transmission of the transmitter, if the comparison indicates that said power index is smaller than said another reference value.

11. The apparatus as set forth in claim 9, further comprising at least two transmitters, wherein the power index defining element is configured to define the power index on the basis of all simultaneously used transmitters.

12. The apparatus as set forth in claim 9, wherein said power controller comprises an interrupter configured to interrupt the transmission power of said transmitter.

13. The apparatus as set forth in claim 9, further comprising a timeslot transmitter configured to transmit information in timeslots from said transmitter, and that said power controller comprises a timeslot changer configured to change the number of transmission timeslots per time unit.

14. The apparatus as set forth in claim 9, wherein said power index defining element comprises a calculator configured to define the power index at different moments of time by calculating the increase in the power index, and a combiner configured to combine at least part of the calculated power index increase and at least part of the power index increase defined during the previous moment of time as the new power index.

* * * * *